(12) United States Patent
Kong et al.

(10) Patent No.: US 7,095,002 B2
(45) Date of Patent: Aug. 22, 2006

(54) ADAPTIVE LIGHTING CONTROL FOR VISION-BASED OCCUPANT SENSING

(75) Inventors: Hongzhi Kong, Kokomo, IN (US); Qin Sun, Kokomo, IN (US); Adil Ansari, Kokomo, IN (US); Jeffrey H. Burns, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 292 days.

(21) Appl. No.: 10/784,368

(22) Filed: Feb. 23, 2004

(65) Prior Publication Data

US 2005/0184217 A1    Aug. 25, 2005

(51) Int. Cl.
*G01J 1/32* (2006.01)
(52) U.S. Cl. .................................................. 250/205
(58) Field of Classification Search ............... 250/205, 250/208.1; 356/603
See application file for complete search history.

(56) References Cited

U.S. PATENT DOCUMENTS

| | | | | |
|---|---|---|---|---|
| 4,239,392 A | * | 12/1980 | Pohle | 356/521 |
| 5,623,139 A | * | 4/1997 | Sliski | 250/205 |
| 6,617,559 B1 | * | 9/2003 | Emery et al. | 250/205 |
| 2003/0067537 A1 | * | 4/2003 | Myers | 348/47 |

\* cited by examiner

*Primary Examiner*—Georgia Epps
*Assistant Examiner*—Tony Lu
(74) *Attorney, Agent, or Firm*—Stefan V. Chmielewski (57) ABSTRACT

An object surface characterization system with adaptive lighting control includes a light projector, a light source, a camera, a processor and a memory subsystem. The processor is coupled to the light projector, the light source and the camera, as well as the memory subsystem. The memory subsystem stores code that, when executed by the processor, instructs the processor to perform a number of steps to achieve adaptive lighting control for the system.

20 Claims, 6 Drawing Sheets

ADAPTIVE LIGHTING CONTROL FOR VISION-BASED OCCUPANT SENSING

TECHNICAL FIELD

The present invention is generally directed to adaptive lighting control and, more specifically, to adaptive lighting control for a vision-based occupant sensing system.

BACKGROUND OF THE INVENTION

Some vision-based occupant sensing systems have implemented dual cameras to perform optical triangulation ranging. However, such systems with dual cameras tend to be slow and expensive and generally have poor distance measurement accuracy, when an object to be ranged lacks surface texture. Other vision-based occupant sensing systems have implemented a single camera and temporally encoded probing beams for triangulation ranging. In those systems, the probing beams are sequentially directed to different parts of the object through beam scanning or control of light source arrays. However, such systems are generally not suitable for high volume production and/or are limited in spatial resolution. In general, as such systems measure distance one point at a time, fast two-dimensional (2D) ranging cannot be achieved unless an expensive high-speed camera is used.

A difficulty with using a single camera and simultaneously projected probing beams for triangulation is distinguishing each individual beam image from the rest of the beam images in the image plane. As the target distance is measured through the correlation between the distance of the target upon which the beam is projected and the location of the returned beam image in the image plane, each individual beam image must be distinguished to accurately profile a given target. However, when multiple beam images are simultaneously projected, one particular location on the image plane may be correlated with several beam images with different target distances. In order to measure distance correctly, each beam image must be labeled without ambiguity.

Various approaches have been implemented or contemplated to accurately locate and label beams of a beam matrix. For example, manually locating and labeling beams has been employed during calibration. However, manual locating and labeling beams is typically impractical in high volume production environments and is also error prone.

Another beam locating and labeling approach is based on the assumption that valid beams in a beam matrix are always brighter than those beams outside the matrix and the entire beam matrix is present in the image. However, this assumption creates strong limitations on a beam matrix projector and the sensing range of the system. Further, due to the imperfection of most projectors, it has been observed that some image noises can be locally brighter than some true beams. Further, desired sensing ranges for many applications result in partial images of the beam matrix being available.

In at least one vision-based occupant sensing system an additional diffused light source, e.g., a light emitting diode (LED), has been used in conjunction with a light projector or structured light source to enhance the acquisition of occupant images by a camera. In a typical vision-based occupant sensing system, two consecutive frames are generally required to accurately obtain range and image information. A first frame of image information is usually captured with both the diffused light source and the structured light source providing target illumination. A second frame is then captured with only the diffused light source providing target illumination. The difference of the two frames allows for the extraction of the structured probing beams (for range measurement). In this manner, the combination of the 2D images and the range profiles provides three-dimensional (3D) occupant information that can be used in various automotive applications, e.g., occupant classification in airbag safety applications.

When the diffused light source remains at a constant illumination, the image intensities captured by the camera can be significantly affected by many factors, such as changes in object reflectance, target distance and ambient light. For limited dynamic range and sensitivity of the system, a large variation of lighting conditions can cause dim or saturated images that lead to difficulties for accurate occupant classification. Such a system also requires that the camera be capable of registering the illumination provided by the diffused light source and the structured light system at the same time. Since the beam characteristics of the structured light (collimated) and the LED illumination (diffused) are very different, the contributions of the two light sources to the image strongly depend on the target distance.

What is needed is an occupant sensing system that is capable of adapting to varying lighting conditions.

SUMMARY OF THE INVENTION

The present invention is directed to an object surface characterization system with adaptive lighting control that includes a light projector, a light source, a camera, a processor and a memory subsystem. The processor is coupled to the light projector, the light source and the camera, as well as the memory subsystem. The memory subsystem stores code that, when executed by the processor, instructs the processor to perform a number of steps. Initially, the light projector is controlled to selectively provide a plurality of light beams arranged in a beam matrix of rows and columns. The light beams impinge on a surface of a target and are reflected from the surface of the target.

The light source is also controlled to selectively illuminate the surface of the target. The camera is then directed to capture a first image frame and a second image frame. The first image frame includes contributions provided by the light source and a plurality of light beams of the beam matrix after reflection from the surface of the target. The second image frame includes contributions provided by the light source after reflection from the surface of the target. At least a portion of the first and second image frames is examined to provide an indication of the intensities of the plurality of light beams and the light source. Finally, a camera integration time of the camera and a pulse width of the light source are controlled, based upon the intensities of the plurality of light beams and the light source, to achieve a desired target illumination.

According to one embodiment of the present invention, the light source includes at least one light emitting diode (LED) and the light projector includes a laser and a diffraction grating that provides the beam matrix of rows and columns. According to another embodiment of the present invention, the light source includes a diffuser positioned between the LED and the target. According to still another embodiment of the present invention, the camera includes a near infrared (NIR) filter positioned between the camera and the target. According to another aspect of the present invention, the size of at least one of the light beams provides an indication of the intensity of light provided by the light projector.

According to a different aspect of the present invention, the portion of the first and second image frames that is examined includes an area that is defined by the plurality of light beams in the first image frame. The memory subsystem may also store additional code that allows the processor to perform a number of additional steps, which include determining an intensity differential between the first and second image frames, estimating the light source intensity, based upon the intensity of the second image frame, and estimating the light projector intensity, based upon the intensity differential between the first and second image frames.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

According to the present invention, an object sensing system, e.g., a vision-based occupant sensing system, is disclosed that controls a camera integration time and a light emitting diode (LED) pulse width dynamically to allow the system to adapt to varying light conditions. An object sensing system constructed according to the present invention implements a control routine that uses certain areas in the image frame to estimate light intensities of both an LED and a light projector, i.e., a structured light source. The light intensities are then compared to a set of pre-determined thresholds for adjustment, if needed. Using a set of selection rules, the integration time and the LED pulse width are determined to achieve optimized and balanced LED and structured light illuminations.

Figure 1:
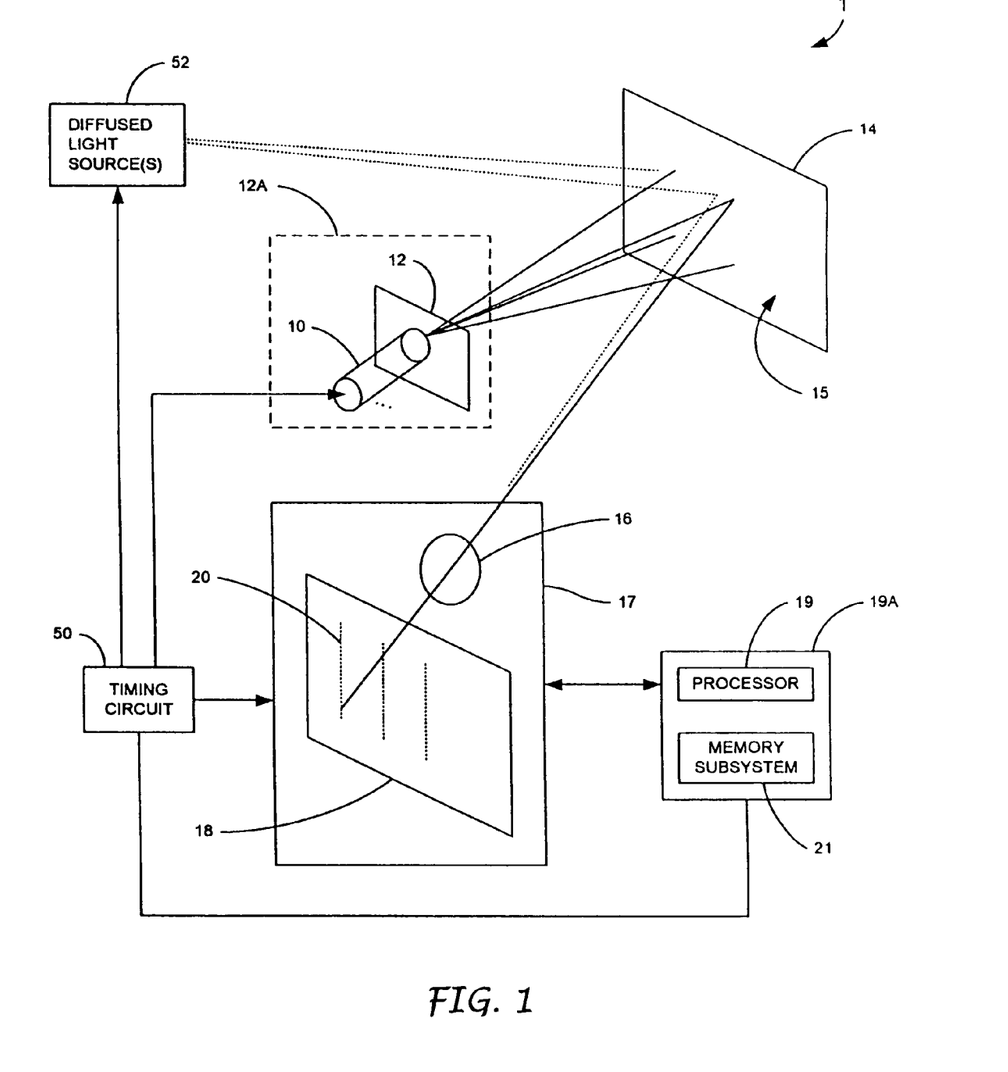
FIG. 1 is a block diagram of an exemplary object surface sensing system configured according to one aspect of the present invention.

With reference to FIG. 1, an optical surface configuration system 1 is depicted. The system 1 includes a laser or similar source of electromagnetic radiation 10 that directs an optical beam to an optical diffraction grating 12, which splits the beam into a plurality of beams, producing a rectangular grid pattern on a surface 15 of a target 14. The beams are reflected from the surface 15 of the target 14 and a camera 17 is positioned to receive the reflected beams. A lens 16 of the camera 17 focuses the received beams onto an image surface 18, which provides an image plane 20. A control unit 19A includes a processor 19 coupled to a memory subsystem 21. The control unit 19A, which may be a personal computer (PC) processes images formed in the image plane 20 of the camera 17.

Figure 2A:
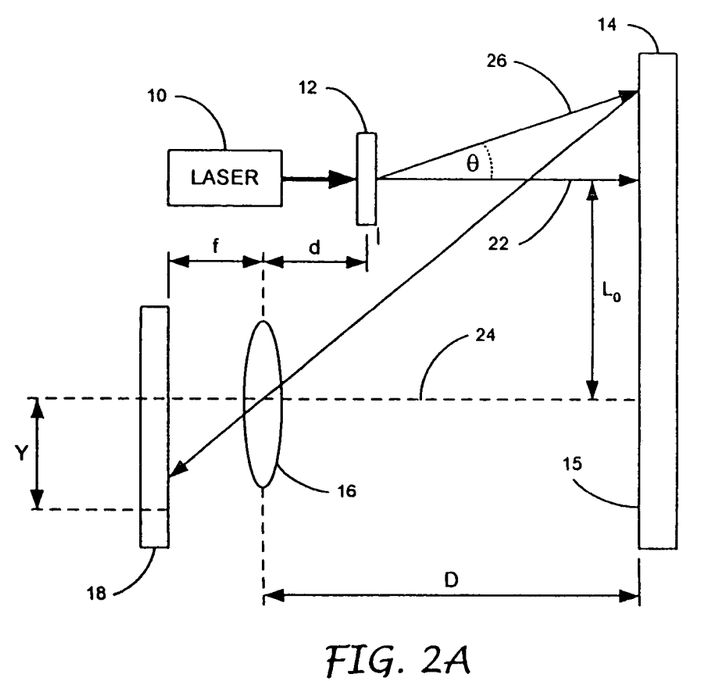
FIGS. 2A and 2B are diagrams showing vertical and horizontal triangulation relationships, respectively, for the system of FIG. 1.

With reference to FIG. 2A, the target 14 is shown having the surface 15 in an x-y plane at a distance 'D' in the 'z' direction from the lens 16, where the 'x' direction is perpendicular to the page and the 'z' and 'y' directions are horizontal and vertical, respectively, on the page. As is shown, the grating 12 is closer than the lens 16 to the surface 15 of the target 14 in the 'z' direction, by a distance 'd'. The image surface 18 is a distance 'f' from the lens 16 in the opposite 'z' direction. A center 22 of the grating 12 is a distance $L_0$ from the lens axis 24 in the 'y' direction. A beam 26 is directed by grating 12 at an angle θ from the horizontal 'z' axis to strike the surface 15 of the target 14 and is reflected back from the surface 15 through the lens 16 of the camera 17 to strike the image plane 20 of the camera 17 at a distance 'Y' from the lens axis 24. Vertical triangulation is based on a mathematically derived relationship expressed in the following equation:

$$Y=\{f^*[L_0+((D-d)^*\tan\theta)]\}/D$$

For a given target distance, the preceding equation uniquely defines the image location 'Y' in the image plane. Thus, the target distance may be derived from the image location in the following equation. If 'd' is chosen to be zero (i.e., the diffraction grating 12 is placed in the same plane as the camera lens 16) the equation reduces to:

$$Y=f^*[(L_0/D)+\tan\theta]$$

Figure 2B:
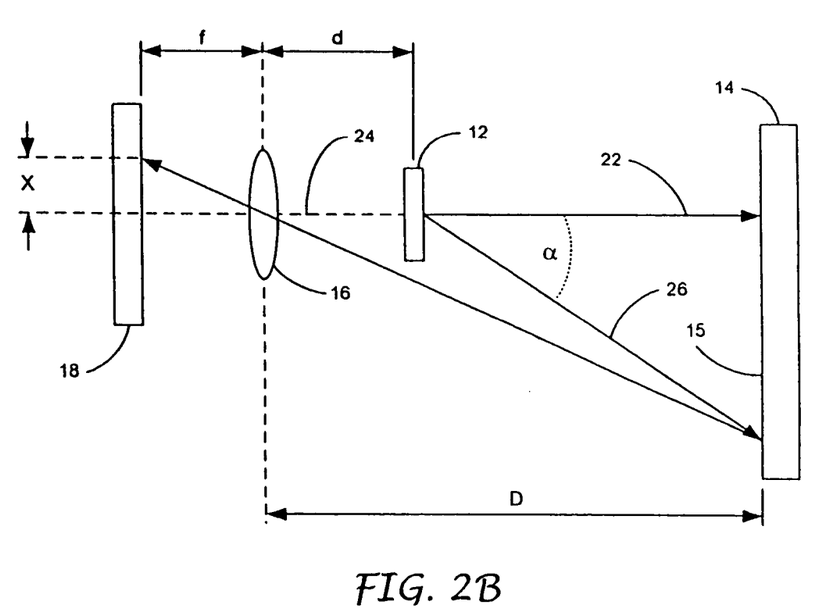

When two dimensional probing beams are involved, horizontal triangulation is generally also employed. A horizontal triangulation arrangement is shown in FIG. 2B, with α being the diffracted beam angle and the image location in the image plane corresponding to 'X'. The mathematical relationship is expressed in the following equation:

$$X=f^*(\tan\alpha^*(1-d/D))$$

Since the beams have different horizontal diffraction angles α, the spatial separation on the image plane between the beams is non-uniform as 'D' varies. However, if 'd' is made zero (i.e., the diffraction grating 12 is placed in the same plane as the camera lens 16), the dependence disappears and the distance 'X' may be derived from the following equation:

$$X=f^*\tan\alpha$$

It should be appreciated that an optical configuration may be chosen as described above with the optical grating 12 placed in the same plane as that of the camera lens 16. In this manner, the horizontal triangulation, which may cause difficulties for spatial encoding, can be eliminated. In a system employing such a scheme, larger beam densities, larger fields of view and larger sensing ranges for simultaneous multiple beam ranging with a single camera and two dimensional (2D) probing beams can generally be achieved. Thus, it should be appreciated that the system 1 described above allows a two dimensional (2D) array of beams to be generated by the optical grating 12 to comprise a first predetermined number of rows of beams, each row containing a second number of individual beams. Each of the beams, when reflected from the surface 15 of the target 14, forms a beam image, which lies similar on a beam path in the image surface 18. The beam paths of all the beam images are straight generally parallel lines and readily allow for optical object-to-surface characterization using optical triangulation with a single camera.

During system calibration, a flat target with a substantially uniform reflectivity is positioned at a distance from the camera system. For a vertical epipolar system (i.e. the light projector is vertically aligned with the camera relative to the image frame), the matrix image shifts up and down as target distance varies. A routine for locating and labeling beams of a beam matrix is disclosed in U.S. Pat. No. 7,002,699, entitled "IDENTIFICATION AND LABELING OF BEAM IMAGES OF A STRUCTURED BEAM MATRIX," the entire disclosure of which is hereby incorporated by reference in its entirety.

With reference again to FIG. 1, the structured light projector 12A may include a near infrared (NIR) laser that provides a laser beam to a diffraction grating that emits a dot beam matrix, e.g., a 15 by 7 dot beam matrix. In one embodiment, the diffused light source 52 includes two LEDs, located behind diffusers, that emit NIR light into an area within the field of view of the camera 17 and into the area defined by the dot beam matrix. The camera 17, which may include a NIR filter that blocks visible light, captures images illuminated by the LED alone and by both the LED and the structured light projector 12A. The camera 17, the diffused light source(s) 52 and the laser 10 are coupled to timing circuit 50, which is further shown in FIG. 3A.

Figure 3A:
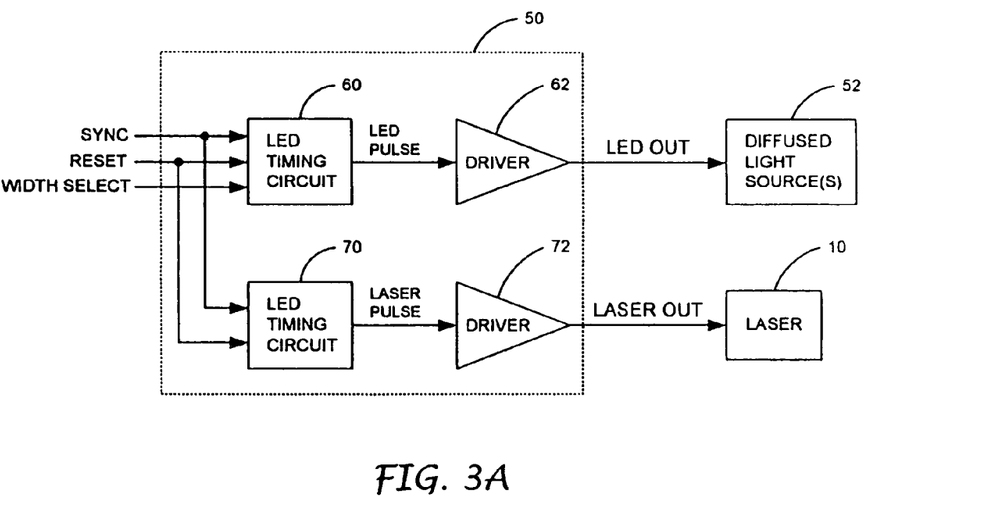
FIG. 3A is an exemplary electrical block diagram of the timing circuit of FIG. 1.
Figure 3B:
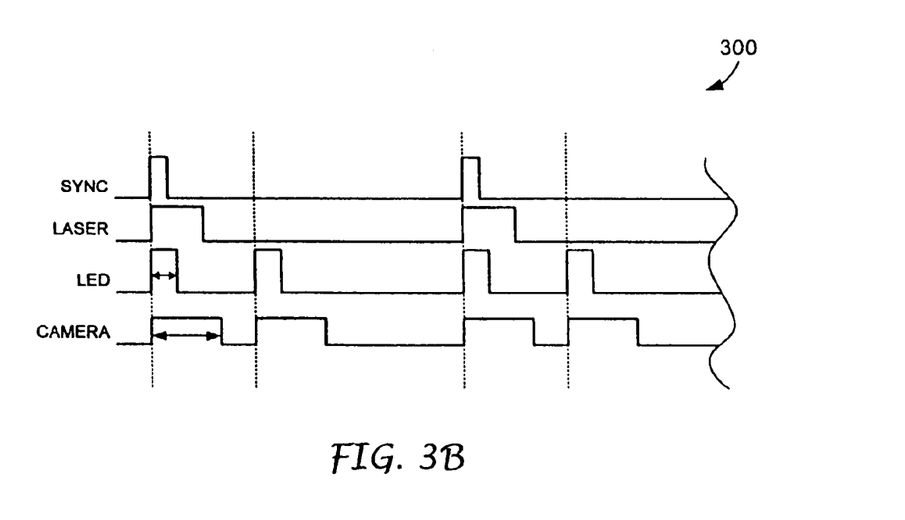
FIG. 3B is an exemplary timing diagram for the timing circuit of FIG. 3A.

With reference to FIGS. 1 and 3A, the timing circuit 50 is coupled, via digital control I/O lines, to the control unit 19A, which is programmed to provide control signals to inputs of the timing circuit 50. The timing circuit 50 synchronizes operation of the camera 17 (e.g., an electronic global shutter camera), the laser 10 and the light source(s) 52. With reference to FIGS. 3A and 3B, a 'SYNC' signal is used to trigger the camera 17 and a 'RESET signal is used as a reference so that only one laser pulse is triggered by the first SYNC signal after each reset. The combination of the SYNC, RESET and WIDTH SELECT (LED signal FIG. 3B) signals may provide different LED pulse widths, e.g., pulse widths of 0.256 mS, 0.512 mS, 1.024 mS, 2.048 mS, 2.096 mS, 8.192 mS and 16.384 mS. According to one embodiment of the invention, the amplitude of the LED pulses and both the amplitude and pulse width of the laser are substantially constant during operation.

Thus, selection of a proper camera integration time and LED pulse width controls the LED and laser illumination levels. Assuming that the intensity levels registered at the camera from the laser and the LEDs are 'A' and 'B', respectively, the acceptable range of the laser intensity level is determined by a maximum camera integration time $T_{max}$ and a minimum camera integration time Tmin:

$$T_{max} = T \times \frac{A_{max}}{A}$$ (Equation 1A)

$$T_{min} = T \times \frac{A_{min}}{A}$$ (Equation 1B)

In equations 1A and 1B, $A_{max}$ and $A_{min}$ are predetermined thresholds of a maximum laser intensity level and a minimum laser intensity level, respectively, registered by the camera. 'A' is the estimated laser intensity level with the current integration time 'T'. An acceptable laser illumination level, defined to be between $A_{max}$ and $A_{min}$, is then achieved by adjusting a camera integration time within the range defined by $T_{max}$ and $T_{min}$. As the camera integration time is generally quasi-continuous, the target integration time $T_{target}$ is adjusted to approximately $(T_{max}+T_{min})/2$, whenever possible.

Similarly, the acceptable range of LED intensity levels may be determined by an acceptable maximum LED pulse width $W_{max}$ and a minimum LED pulse width $W_{min}$:

$$W_{max} = W \times \frac{B_{max}}{B}$$ (Equation 2A)

$$W_{min} = W \times \frac{B_{min}}{B}$$ (Equation 2B)

Figure 4:
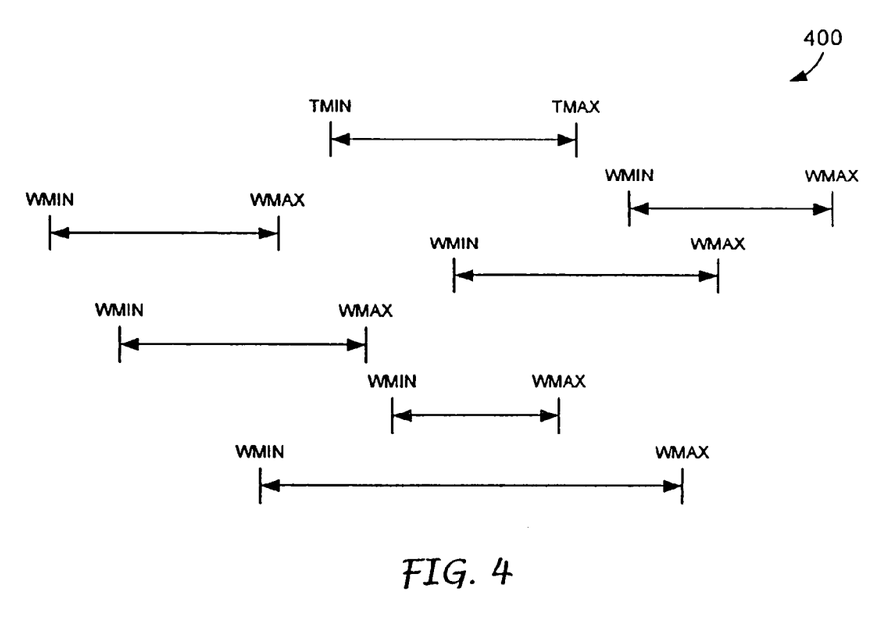
FIG. 4 is a diagram depicting relationships between a desired camera integration time and a light source pulse width.

In equations 2A and 2B, $B_{max}$ and $B_{min}$ are predetermined thresholds of a maximum LED intensity level and a minimum LED intensity level, respectively, registered by the camera. 'B' is the estimated LED intensity level with the current LED pulse width 'W'. It should be appreciated that the camera integration time may also affect the LED illumination level registered by the camera if the camera integration time is shorter than the LED pulse width. Furthermore, the selection of LED pulse width may be limited. If both the LED and the laser illumination levels are found within their acceptable ranges, the camera integration time and the LED pulse width are not adjusted. If one or both of the illumination levels are not within the acceptable range, a control routine selects a proper integration time and/or LED pulse width that satisfy equations 1A, 1B, 2A and 2B. FIG. 4 shows a graph 400 depicting six possible relationships between the acceptable camera integration time 'T' and the LED pulse width 'W'.

Figure 5:
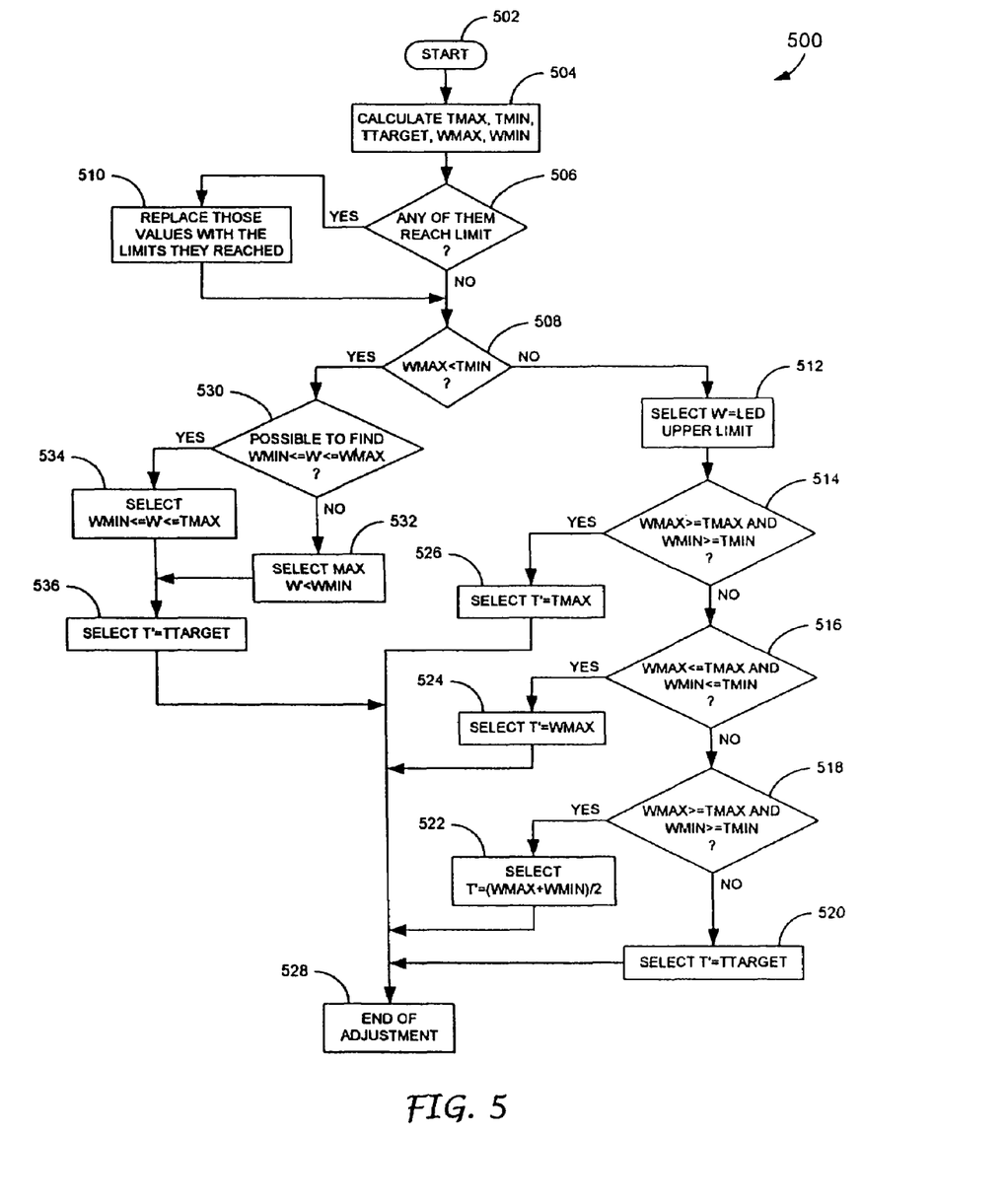
FIG. 5 is an exemplary flow chart of a routine for selecting a camera integration time and a light source pulse width.

With reference to FIG. 5, an exemplary adjustment routine 500 that determines a proper camera integration time T' and an LED pulse width W' is depicted. In this embodiment, the LED pulse width is selected from among seven available choices and the camera integration time is quasi-continuous.

The routine 500 is initiated in step 502, at which point control transfers to step 504, where $T_{max}$, $T_{min}$, $T_{target}$, $W_{max}$ and $W_{min}$ are calculated. Next, in decision step 506, it is determined whether the camera integration time and/or the LED pulse width have reached their limit. If the camera integration time and/or the LED pulse width have reached their limit, control transfers to step 510, where the values that have exceeded their limit are placed with the limits they have reached, at which point control transfers to decision step 508. In step 506, when neither the camera integration time nor the LED pulse width have reached their limits, control transfers directly to step 508. In step 508, it is determined whether the LED pulse width maximum $W_{max}$ is less than camera integration time minimum $T_{min}$. If so, control transfers from step 508 to decision step 530. Otherwise, control transfers from step 508 to step 512.

In step 512, an LED pulse width W', that is equal to the LED upper limit ($W_{max}$), is selected and control transfers to decision step 514. In step 514, it is determined whether the maximum pulse width $W_{max}$ is greater than or equal to maximum camera integration time $T_{max}$ and the minimum pulse width $W_{min}$ is greater than or equal to minimum camera integration time $T_{min}$. If so, control transfers from step 514 to step 526, where the camera integration time T' is set to $T_{max}$, before transferring control to step 520, where the routine 500 ends its adjustment. In step 514, when the condition is not true, control transfers to decision step 516, where it is determined whether $W_{max}$ is less than or equal to $T_{max}$ and $W_{min}$ is less than or equal to $T_{min}$. If so, control transfers from step 516 to step 524, where the camera integration time T' is set to the maximum LED pulse width $W_{max}$ before transferring control to step 528.

If the condition is not true in step 516, control transfers to decision step 518, where it is determined whether the maximum LED pulse width $W_{max}$ is less than or equal to the maximum camera integration time $T_{max}$ and the minimum LED pulse width $W_{min}$ is greater than or equal to the minimum camera integration time $T_{min}$. If so, control transfers from step 518 to step 522, where the camera integration time T' is set equal to $W_{max}$ plus $W_{min}$ divided by 2, before transferring control to step 528. In step 518, when the condition is not true, control transfers to step 520, where the camera integration time T' is set to the target integration time ($T_{target}$), before transferring control to step 528.

The estimation of current laser and LED light levels are conducted in the areas that are defined by the structured laser beams. The location and identification of those beams can be determined from the structured light configuration (Spatial Encoding Method) as described in U.S. Pat. No. 6,762,427 entitled "OBJECT SURFACE CHARACTERIZATION USING OPTICAL TRIANGULATION AND A SINGLE CAMERA," the entire disclosure of which is hereby incorporated herein by reference in its entirety. As is disclosed in U.S. Pat. No. 7,002,699, the method first finds the structured laser beams in the image plane. Over these beam areas, the average LED light level B and the averaged laser light level A are then calculated. The LED light level estimation uses the image frame when LED light is the only illumination. The laser light level estimation uses differential frames between the image when both the LED and the laser are turned on and the image when only LED illumination is turned on.

Figure 6:
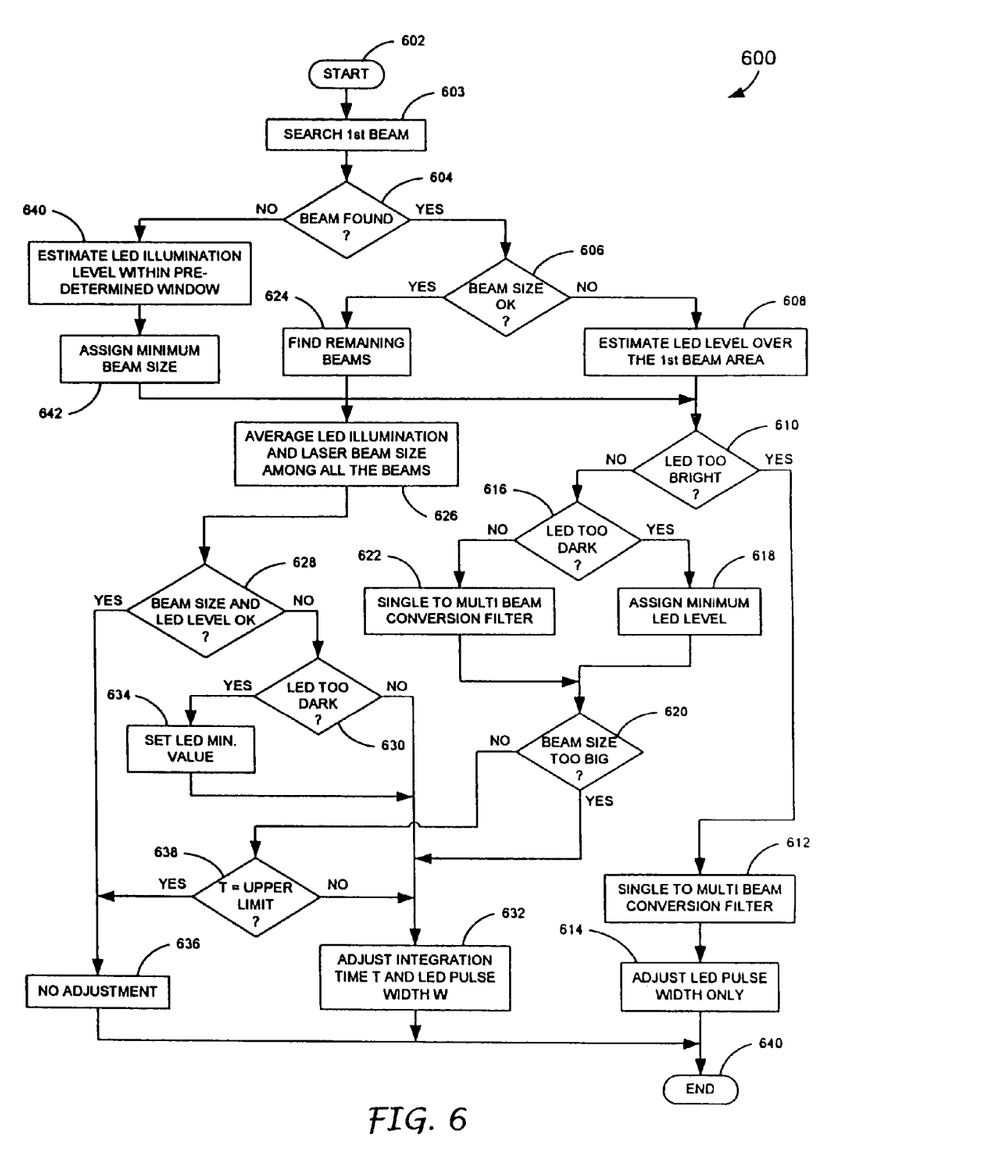
FIG. 6 is an exemplary flow chart of a routine for selecting a camera integration time and a light source pulse width based upon a light beam size.

With reference to FIG. 6, an exemplary beam sizing routine 600 is initiated in step 602. Next, in step 603, the routine 600 searches for a first beam. Then, in decision step 604, if a beam is found, control transfers to decision step 606. Otherwise, control transfers from step 604 to step 640. In step 640, an LED illumination level within a predetermined window is estimated and control transfers to step 642. In step 642, a minimum beam size is assigned before control transfers to decision step 610. When a beam is found in step 604, control transfers to step 606, where it is determined whether the beam size of the beam is satisfactory. If so, control transfers to step 624, where the remaining beams are found. Otherwise, control transfers from step 606 to step 608, where an LED level over the first beam area is estimated.

Then, in step 610, it is determined whether the LED level is too high, i.e., whether an LED is too bright. If the LED is too bright in step 610, control transfers to step 612, where a single to multi beam conversion filter is initiated. Next, in step 614, the LED pulse width is adjusted, before transferring control to step 640, where the routine 600 terminates. In step 610, when the LED is not too bright, control transfers to decision step 616, where it is determined whether the LED is too dark. If so, control transfers from step 616 to step 618, where a minimum LED illumination level is assigned, and then to decision step 620. Otherwise, control transfers from step 616 to step 622, where a single to multi beam conversion filter is implemented, before transferring control to step 620.

In step 620, it is determined whether the beam size is too big and, if so, transfers control to step 632, where the integration time T and the LED pulse width W are adjusted, upon which control is transferred to step 640. If the beam size is not too big in step 620, control transfers to decision step 638, where the routine determines whether the camera integration time T is equal to the upper limit. If so, control transfers to step 636, where no adjustment is implemented, and then transfers to step 640, where the routine 600 terminates. If the camera integration time T is not equal to the upper limit in step 638, control transfers to step 632, as was previously discussed, and then to step 640.

When the beam size is not satisfactory in step 606, control transfers to step 624, where the rest of the beams are found, and then to step 626, where the LED illumination and laser beam size among all the beams is averaged, at which point control transfers to decision step 628. In step 628, it is determined whether the beam size and LED level are satisfactory. If so, control transfers from step 628 to step 636 and then to step 640. Otherwise, control transfers from step 628 to decision step 630, where it is determined whether the LED is too dark. If so, control transfers from step 630 to step 634, where the LED pulse width is set to a minimum value, at which point control transfers to step 632. In decision step 630, when the LED is not too dark, control transfers directly to step 632. As previously discussed, in step 632, the camera integration time T and the LED pulse width W are adjusted, before transferring control to step 640, where the routine 600 terminates.

It is possible that the laser beams may not be found due to initial lighting conditions, such as dark laser illumination or saturated LED illumination levels. When that happens, the technique estimates the LED and laser illumination levels near the center of the image frame within an area that contains at least one laser beam (the window size is bigger than the period of the structured light beam spacing). If the estimated illumination levels are not within another predetermined range (too bright or too dark), a set of default values may be used to adjust the initial lighting conditions.

The laser illumination levels are closely related to the laser beam size. In fact, the laser beam size may generally be more important in the application. As such, the algorithm may actually use the estimated beam size, rather than the estimated laser intensity, to make the adjustment. This is achieved simply by replacing Eq.(1) with:

$$T_{max} = T \times \frac{\Phi_{max}}{\Phi} \tag{3a}$$

$$T_{min} = T \times \frac{\Phi_{min}}{\Phi} \tag{3b}$$

where $\Phi_{max}$ and $\Phi_{min}$ are predetermined maximum and minimum laser beam size thresholds, respectively and $\Phi$ is the current estimated beam size with the integration time T. According to this embodiment, adjustment of integration time occurs only when the estimated beam size is outside the range defined by $\Phi_{max}$ and $\Phi_{min}$. The estimated beam size and LED illumination level can be averaged values over all the beams and their associated areas in the image plane. However, if the beam size of the first beam located by the algorithm is outside the desired range (and therefore the rest of the beams may not be able to be correctly located), the estimation will be conducted over the single beam area. Due to spatial variations of the LED illuminations and the predetermined location of the first beam, the estimated LED illumination level over a single beam area can be significantly different from that when the average values are used over all the beam areas. In order to use a common set of adjustment thresholds, a conversion filter between estimated LED illumination level in a single beam area and averaged LED illumination level over multiple beam areas is used.

Accordingly, a system and method have been described herein that is capable of adapting to varying lighting conditions. Such a system is particularly advantageous when implemented within a vision-based occupant sensing system for a motor vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An object surface characterization system with adaptive lighting control, the system comprising:
   a light projector for selectively providing a plurality of light beams arranged in a beam matrix of rows and columns, wherein the light beams impinge on a surface of a target and are reflected from the surface of the target;
   a light source for selectively illuminating the surface of the target;
   a camera for capturing a first image frame and a second image frame, wherein the first image frame includes contributions provided by the light source and the plurality of light beams of the beam matrix after reflection from the surface of the target, and wherein a second image frame includes contributions provided by the light source after reflection from the surface of the target;
   a processor coupled to the light projector, the light source and the camera; and
   a memory subsystem coupled to the processor, wherein the processor is configured to examine at least a portion of the first and second image frames to provide an indication of the intensities of the plurality of light beams and the light source and control a camera integration time of the camera and a pulse width of the light source based upon the intensities of the plurality of light beams and the light source to achieve a desired target illumination.

2. The system of claim 1, wherein the light source includes at least one light emitting diode (LED) and the light projector includes a laser and a diffraction grating.

3. The system of claim 2, wherein the light source includes a diffuser positioned between the LED and the target.

4. The system of claim 1, wherein the camera includes a near infrared (NIR) filter positioned between the camera and the target.

5. The system of claim 1, wherein a size of at least one of the light beams provides an indication of the intensity of light provided by the light projector.

6. The system of claim 1, wherein the portion of the first and second image frames that is examined includes an area that is defined by the plurality of light beams in the first image frame.

7. The system of claim 1 wherein the processor is configured to perform the additional steps of:
   determining an intensity differential between the first and second image frames;
   estimating the light source intensity based upon the intensity of the second image frame; and
   estimating the light projector intensity based upon the intensity differential between the first and second image frames.

8. A method for providing an object surface characterization system with adaptive lighting control, comprising the steps of:
   controlling a light projector to selectively provide a plurality of light beams arranged in a beam matrix of rows and columns, wherein the light beams impinge on a surface of a target and are reflected from the surface of the target;
   controlling a light source to selectively illuminate the surface of the target;
   directing a camera to capture a first image frame and a second image frame, wherein the first image frame includes contributions provided by the light source and the plurality of light beams of the beam matrix after reflection from the surface of the target, and wherein the second image frame include contributions provided by the light source after reflection from the surface of the target;
   examining at least a portion of the first and second image frames to provide an indication of the intensities of the plurality of light beams and the light source; and
   controlling a camera integration time of the camera and a pulse width of the light source based upon the intensities of the plurality of light beams and the light source to achieve a desired target illumination.

9. The method of claim 8, wherein the light source includes at least one light emitting diode (LED) and the light projector includes a laser and a diffraction grating.

10. The method of claim 9, wherein the light source includes a diffuser positioned between the LED and the target.

11. The method of claim 8, wherein the camera includes a near infrared (NIR) filter positioned between the camera and the target.

12. The method of claim 8, wherein a size of at least one of the light beams provides an indication of the intensity of light provided by the light projector.

13. The method of claim 8, wherein the portion of the first and second image frames that is examined includes an area that is defined by the plurality of light beams in the first image frame.

14. The method of claim 8, further comprising the steps of:
   determining an intensity differential between the first and second image frames;
   estimating the light source intensity based upon the intensity of the second image frame; and
   estimating the light projector intensity based upon the intensity differential between the first and second image frames.

15. An object surface characterization system with adaptive lighting control, the system comprising:
   a light projector for selectively providing a plurality of light beams arranged in a beam matrix of rows and columns, wherein the light beams impinge on a surface of a target and are reflected from the surface of the target;
   a light source for selectively illuminating the surface of the target;
   a camera for capturing a first image frame and a second image frame, wherein the first image frame includes contributions provided by the light source and the plurality of light beams of the beam matrix after reflection from the surface of the target, and wherein the second image frame includes contributions provided by the light source after reflection from the surface of the target;

a processor coupled to the light projector, the light source and the camera; and a memory subsystem coupled to the processor, wherein the processor is configured to examine at least a portion of the first and second image frames to provide an indication of the intensities of the plurality of light beams and the light source and control a camera integration time of the camera and a pulse width of the light source based upon the intensities of the plurality of light beams and the light source to achieve a desired target illumination, wherein the light source includes at least one light emitting diode (LED) and the light projector includes a laser and a diffraction grating.

16. The system of claim 15, wherein the light source includes a diffuser positioned between the LED and the target.

17. The system of claim 15, wherein the camera includes a near infrared (NIR) filter positioned between the camera and the target.

18. The system of claim 15, wherein a size of at least one of the light beams provides an indication of the intensity of light provided by the light projector.

19. The system of claim 15, wherein the portion of the first and second image frames that is examined includes an area that is defined by the plurality of light beams in the first image frame.

20. The system of claim 15, wherein the processor is configured to perform the additional steps of:
   determining an intensity differential between the first and second image frames;
   estimating the light source intensity based upon the intensity of the second image frame; and
   estimating the light projector intensity based upon the intensity differential between the first and second image frames.

* * * * *